United States Patent [19]

Buckler et al.

[11] Patent Number: 5,030,984
[45] Date of Patent: Jul. 9, 1991

[54] METHOD AND ASSOCIATED APPARATUS FOR MINIMIZING THE EFFECTS OF MOTION IN THE RECORDING OF AN IMAGE

[75] Inventors: Andrew J. Buckler, Georgetown, Mass.; Sergei V. Fogel, Rochester, N.Y.

[73] Assignee: Eastman Kodak Company, Rochester, N.Y.

[21] Appl. No.: 554,768

[22] Filed: Jul. 19, 1990

[51] Int. Cl.$^5$ ............................................... G03B 7/08
[52] U.S. Cl. ..................................... 354/430; 358/105
[58] Field of Search ................ 354/430, 456; 358/105, 358/225, 228

[56] References Cited

U.S. PATENT DOCUMENTS

3,399,307  8/1968  Levin ................................. 354/430
4,218,119  8/1980  Schickedanz ..................... 354/430

Primary Examiner—L. T. Hix
Assistant Examiner—Cassandra C. Spyrou
Attorney, Agent, or Firm—Edward Dugas

[57] ABSTRACT

In this method and apparatus, motion is detected by sensing the change in luminance, over time, between sequential images at each image pixel site along with the changes in luminance at neighboring pixel sites. These changes are then used to compute the displacement of the entire image as well as a direction independent degree of image change. With the total displacement computed and represented by signals the signals may then be used to control in real time; camera shutter speed, aperture opening, and/or the movement of the film in a direction that tracks with the motion so as to minimize the blur on the recorded image. These same signals may be stored for later use in, for example, a restoration process.

22 Claims, 5 Drawing Sheets

METHOD AND ASSOCIATED APPARATUS FOR MINIMIZING THE EFFECTS OF MOTION IN THE RECORDING OF AN IMAGE

BACKGROUND OF THE INVENTION

1. Field of the Invention

The present invention is directed to the field of motion detection and more particularly to the utilization of the detected motion to minimize its effect in the recording of an image.

2. Description of Related Art

It has been estimated that 15-20% of consumer pictures have "detectable image blur problems", and that camera shake and subject motion are significant contributors.

A relationship may be established between various shutter speeds and the maximum allowable motion at each speed such that an intelligent camera system always chooses a shutter speed such that motion of less than or equal to a "detectable" limit, in the finished print, is experienced while the shutter is open.

One approach is to hold the shutter open and determine how much movement will degrade the resultant picture "detectably" and "objectionably". Measurements of this motion have been made for typical cameras and for typical users. It has been determined that 0.001" of "equivalent linear smear" is detectable, and 0.002" is objectionable.

The possible motion of a camera has six degrees of freedom, including translational and rotational components. It has been determined experimentally however, that the rotational components of "pitch" and "yaw" dominate the motion at the film plane due to the magnification of the lens. Moreover, these components manifest themselves approximately as linear translations along the two orthogonal axes at the film plane. Therefore, "equivalent linear smear" presumes to take into account the actual motion, the camera's physical dimensions, and the lens focal length.

In the camera art, images captured from moving objects may be compared digitally in order to determine the amount and the direction of the camera's or the image's motion. Such determination is of particular utility in providing information that can be used to dampen the motion of the camera or to determine the motion of a subject. Once the images are captured, for example on film, they can be converted to a digital form and processed utilizing selected image processing methods. Image stabilization for hand-held cameras is important because it minimizes or eliminates the blurring of images captured from subjects that may be either still or moving. In any event, digital comparisons of the images formed in the camera's eye can be used to determine the amount and the direction of the images motion. Such detection is of particular utility in providing information not only for the handling of cameras but also for the determination of the movement of images.

Prior approaches have either ignored the problem altogether (such as in the vast majority of hand-held still cameras and in most consumer camcorders) or have involved the use of mechanical devices to dampen high frequency motions (as in most professional video cameras). Mechanical devices typically suffer from their weight, as well as their inability to measure other motion parameters, such as any form of subject motion. Image degradation may occur however, as a result of subject motion, camera motion, or any combination thereof. Digital processing of the time-varying image offers more flexibility in measuring relative motion than mechanical damping systems; and thereby offers correction or accommodation to a larger class of motion situations.

The prior art in digital processing generally approaches motion detection and measurement in a number of ways. A first is to perform a correlation of the same image region (say, one or more sensor scan lines) is made with itself but at a later time. This gives a "degree of change" but offers no insight into the cause.

A patent of interest for its teachings in this area U.S. Pat. No. 4,673,276, entitled "Blur Detecting Device for a Camera" by Yoshida et al. In that patent a correlation is performed between the output signals from a CCD image sensor at a first and second point in time. These signals are compared against threshold values to determine if allowable levels of blur have been exceeded, if so, means are provided for indicating that unacceptable blurring has occurred and that another picture should be taken.

Another patent of interest for its teachings is, U.S. Pat. No. 4,492,452 entitled "Picture BlurAlarm Device for a Camera" by Suzuki et al. there is disclosed a device that measures absolute luminance (brightness) at multiple image points, each at two disparate times. A comparison is made between the two values at each point, and a voting scheme is used wherein each difference exceeding a threshold provides an alarm signal indicating a blur condition.

Intensity-based approaches are susceptible to differences in illuminant. That is, the output values are generally not normalized for variations in intensity under different illuminant situations. Also, they generally do not yield a "direction" of motion, required if motion is to be compensated for by any means other than decreasing shutter speed.

Alternatively, "gray-level matching" is performed which finds certain predetermined patterns of luminance within the image such as typically exist at "corners", "edge-lets", or other sufficiently interesting features. These are sought in two frames, and their displacement is measured. For two different examples of such methods, see: D. T. Lawton, "Processing Translational Motion Sequences". Computer Vision, Graphics, and Image Processing, 1983, 22, 116-144, and Hans-Hellmut Nagel, "Displacement Vectors Derived from Second-order Intensity Variations in Image Sequences," Computer Vision, Graphics, and Image Processing, 1983, 21, 85-117. A sub-approach if subject motion is of interest finds the "edges" within an image and tracks their movement between frames. This is the highest level method and is the most complex in that it requires a degree of segmentation robustness and symbolic representation not required by the other methods, given their ability to work only based on intensity values. Moreover, many of these methods assume that the optical-flow field has already been calculated and is accessible; a truly prohibitive assumption here.

These aforementioned methods all suffer to various degrees from a number of problems. One is the "correspondence problem" that is the ability of finding common features within two or more images. Another is the computational burden in finding image-specific features, or alternatively in determining acceptable universally useful patch sizes and locations. Also, in general, the methods are susceptible to the difficulties of foreshortening (dimensional differences due to changes in perspective brought about by relative displacement or motion between object and viewer). Intensity-based sub-approaches are susceptible to changes in illuminant. All suffer to varying degrees by forcing a certain amount of the processing to be serial, since even though it is possible to find features in parallel, each one that is discovered must generally be processed serially since their number and nature is image-dependent.

Spatio-temporal gradient approaches measure the image intensity function's partial spatial and temporal derivatives and, based on these values, attempts to measure the "optical flow field", i.e. an array of unique motion vectors at each image site. Such approaches suffer from three principal problems: first, the determination of motion vectors at image sites is found to be mathematically ill-posed. This is because of the so-called "aperture" problem, which recognizes the difficulty in determining the velocity component perpendicular to the image gradient unless other assumptions or cues are utilized. As such, a closed form solution does not exist. The second principal problem, exacerbated by the first, is that any such computation of motion vectors at image sites presents an intractable computational burden with respect to the capabilities of present and foreseeable camera systems. The third problem lies in the difficulty of accurately measuring the spatial derivatives due to the existence of occlusion boundaries (at which the derivative fails to exist).

It would, therefore, be advantageous to have a system that could effectively measure relative motion between camera and subject, in some tenable manner, and that could compensate for the motion conditions, and/or to at least record the motion conditions such that the motion conditions could later be used as a corrective factor to a restorative phase. An initial requirement, however, is to have the measured motion simply influence the shutter speed, favoring high shutter speeds when motion is detected but otherwise allowing it to be low.

SUMMARY OF THE INvENTION

Measurement of a unique motion vector at each pixel site is not required for the present application. At the simplest level, motion of the camera can be determined directly by performing a least-squares fit of a single velocity vector of the entire field to the spatial- and temporal-derivatives at each of the sites within the field.

In the present invention image points distributed across the entire image are used in the computation of partial derivatives in two spatial dimensions as well as temporally. These partial derivative values are combined in such a way as to force the total derivative to be zero. This then yields the relative direction and speed of net translation between subject and camera as well as the overall magnitude of temporal change. In the preferred method of the present invention motion effects are minimized in the recording stage of camera operation by performing the steps of:
  a. capturing at least two sequential images in electrical form as a plurality of pixel values each representing the intensity of the image at a corresponding pixel site;
  b. digitizing each of the pixel values to form digitized images;
  c. smoothing the pixel values in the digitized images;
  d. determining the change in intensity at each pixel site by computing two spatial and one temporal component of change within the image;
  e. computing parameters corresponding to the degree of motion and its net direction (if any), utilizing the computation of the components of change within the image; and
  f. utilizing the computed parameters to control the recording of the image on the recording medium.

In a preferred apparatus embodiment of the present invention there is provided a camera incorporating the above method. The camera responds to detected motion signals to provide a counter motion to the recording medium so as to effectively minimize the recording of the motion. More specifically the apparatus is comprised of a sensor for capturing at least two sequential images in electrical form as a plurality of pixel values each representing the intensity of the image at a corresponding pixel site. Additionally, an A/D converter digitizes each of the pixel values to form digitized images. A smoother smooths the pixel values and a determining means determines the change in intensity at each pixel site by computing two spatial and one temporal derivative components within the image. A computing device computes motion parameters corresponding to the degree of motion and its net direction utilizing the computation of the components of change within the image. A utilization device utilizes the computed motion parameters to control the recording of the image on the recording medium.

From the forgoing it can be seen that it is a primary object of the present invention to provide an improved method and associated apparatus for determining the motion of a hand-held camera and for minimizing its effect on the captured image.

It is another object of the present invention to provide a method and an associated apparatus for determining the motion of an imaged subject with respect to a camera.

A further object of the present invention is to provide an apparatus for adjusting the motion of a film or image sensor in response to the detected relative motion between a camera and an imaged object to minimize blurring.

It is yet another object of the present invention to provide a method and an associated apparatus for minimizing the creation of motion degraded negatives.

And yet another object of the present invention is to record motion parameters which are later used for image restoration purposes.

These and other objects of the present invention will become more apparent when taken in conjunction with the following description and drawings wherein like characters indicate like parts and which drawings form a part of the present description.

DESCRIPTION OF THE PREFERRED EMBODIMENTS OF THE INVENTION

Figure 1:
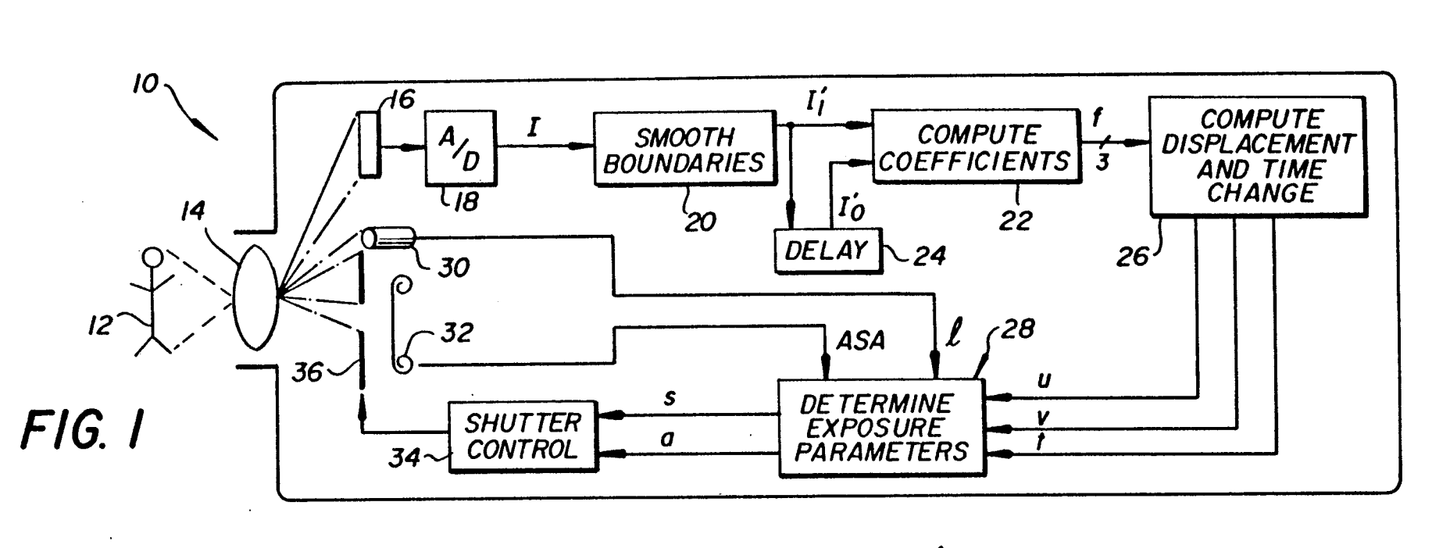
FIG. 1 illustrates in block diagram form a camera incorporating the present invention.
Figure 2:
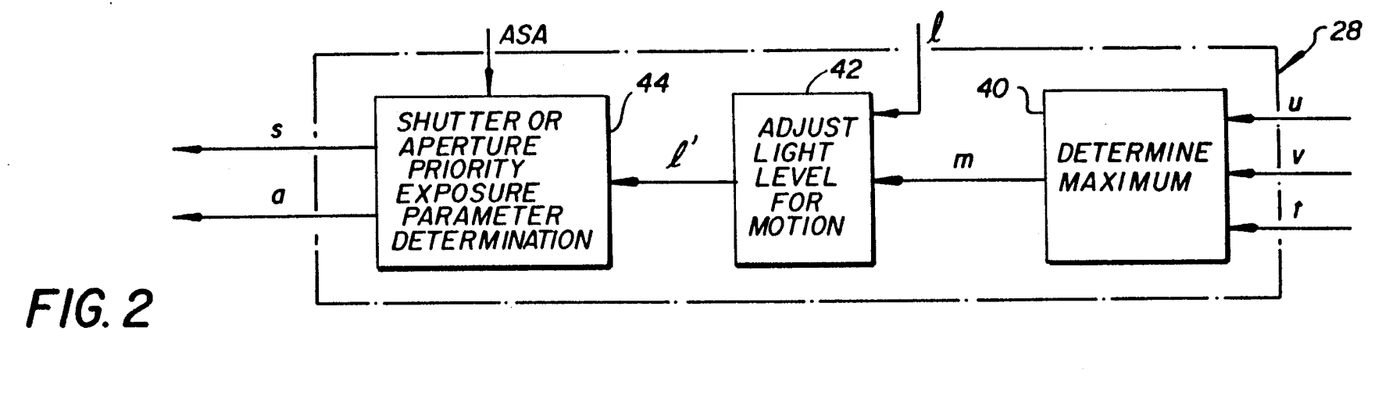
FIG. 2 illustrates a number of functional sub-blocks which form one of the blocks illustrated in FIG. 1.

Referring to FIG. 1, the apparatus of the present invention is comprised in part of a camera 10 having an image sensor 16 and a film pack 32 onto which the image 12 is focused by a lensing system 14. Although a film pack 32 is shown as the preferred image recording medium it is obvious that other media such as a CCD image sensor could also be used. The electrical signals from the sensor 16 are directed to the input of an A/D converter 18. The converter 18 provides as its output a digitized image labeled I. The I signal is directed to the input to a smooth boundaries block 20 wherein the input I signal is smoothed per a technique to be described later in the description to provide an output signal $I_1$. That signal is directed to the input of a compute coefficients block 22 and to the input of a delay circuit 24. The delay circuit 24 provides an output $I_0$. The compute coefficients block 22 receives the delayed and the undelayed signals and provides three signals generically labeled f. These signals equal the computed motion coefficients and correspond to the two spatial and one temporal partial derivatives u, v, and t. The output signals provided by the compute displacement and time change block 26 are the signals u, v, and t. These three signals are directed as inputs to a determine exposure parameters box 28. FIG. 2 illustrates in more detail the functional blocks that form block 28. The functional blocks are labeled 40, 42, and 44. Without going into detail, at the present time, it will be stated that the inputs u, v, and t, represent the motion of the overall image in the x, and y direction and in the time domain, respectively. Also provided as inputs to box 28 are an illuminant signal L and an ASA signal. The illuminant signal is derived from an illuminant detector 30 and the ASA signal from the film used in the film pack 32. The determine exposure parameters box 28 utilizes all of the input signals to arrive at a shutter speed S and an aperture value A control signal. The signals, S and A, are used by a shutter control 34 to control the speed of the camera's shutter and the opening of the camera's aperture 36. Block 28 includes a determine maximum function block 40, an adjust light level for motion function block 42, and a shutter or aperture priority exposure parameter determination function block 44. The determine maximum block 40 receives the three signals u, v, and t and makes a determination to provide a maximum value signal m. The maximum value signal m is compared against the value of the signal L generated by the illuminant detector 30 in block 42 so as to provide an adjustment signal L'. The signal L' is equal to L-m (the light level compensated for motion). The signal L' along with the signal ASA are used by the shutter or aperture priority exposure parameter determination block 44 to provide the proper shutter or aperture control signals S and A, respectively.

Figure 3:
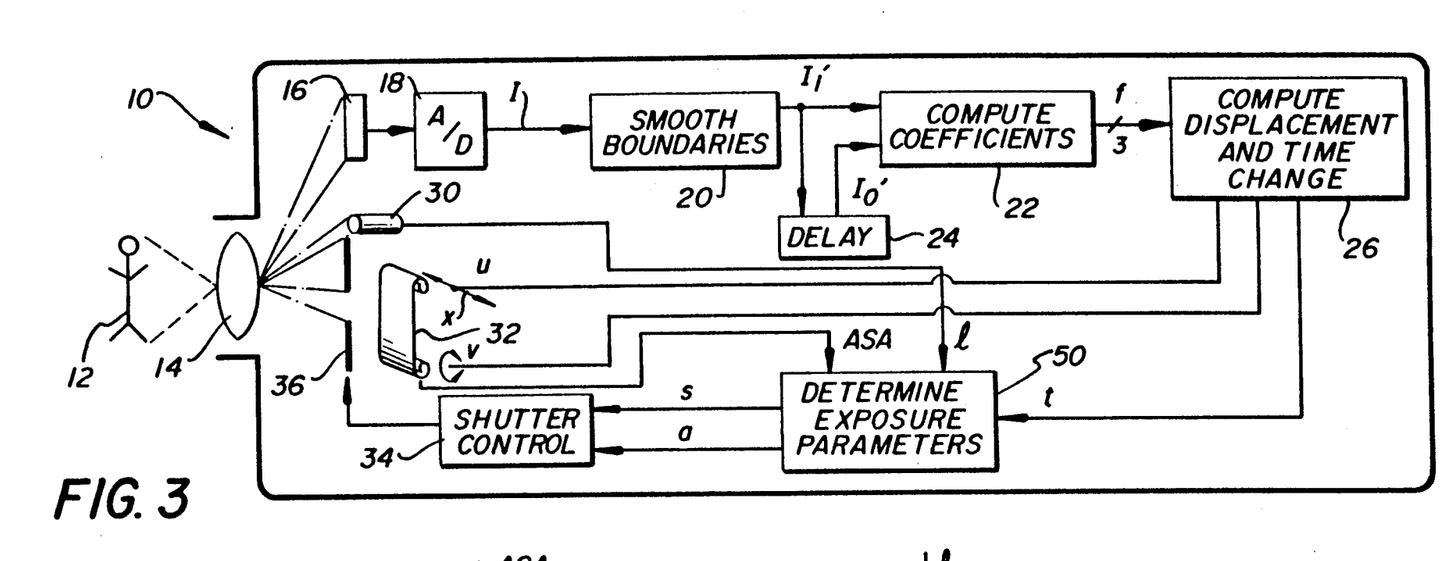
FIG. 3 illustrates another embodiment of the present invention incorporated in a camera.

In FIG. 3 there is disclosed another embodiment of the invention which utilizes the signals u and v to drive the film pack 32 in directions which counter the relative motion between the camera and a subject. That action effectively cancels and/or minimizes the blurring of the recorded image. The embodiment of FIG. 3 is identical to that of FIG. 1 with the exceptions that the determine exposure parameters block 50 of FIG. 3 does not receive the signals u and v and that the signal u is used to cause the film pack 32 to be driven along the axis illustrated as X, and the signal v is used to drive the film along an axis which is orthogonal to the X axis.

Figure 4:
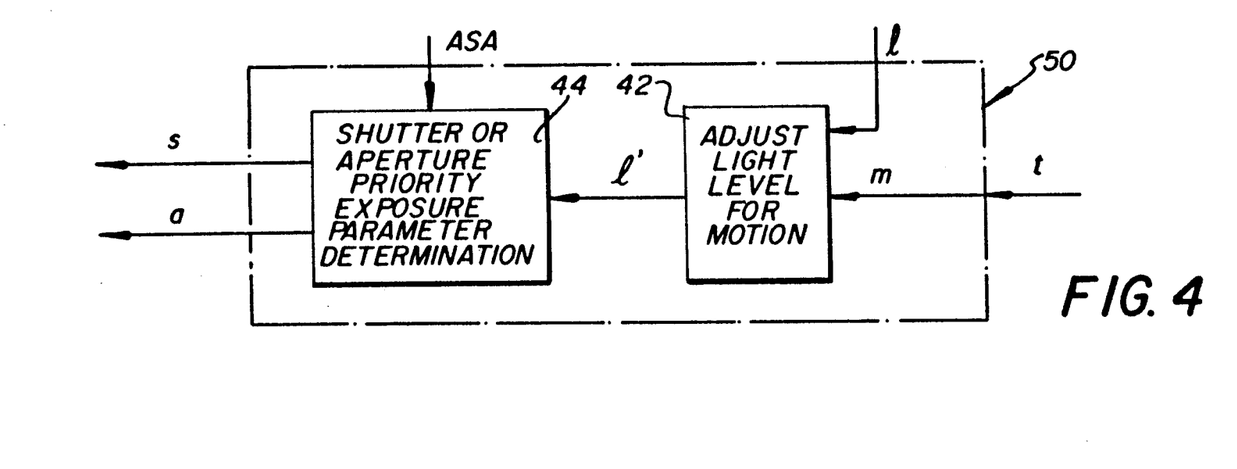
FIG. 4 illustrates a number of functional sub-blocks which form one of the blocks of FIG. 3.

FIG. 4 illustrates the functional blocks 42 and 44 which form block 50. The operation of these blocks is identical to the operation of the like numbered blocks of FIG. 2.

In another version of the present invention the signals u, v, and t, may be stored in a memory such as a RAM located in the camera and used at a later time in a restoration process. The camera and/or a removable RAM chip accompanying the recording media could then be brought to a remote processing machine where restoration would be applied.

As was mentioned earlier an algorithm embedded within the present invention is based on the spatio-temporal gradient approach. It operates under the assumption that any intensity changes measured in time are attributed to motion in space. This is approximately true for the short time periods that are relevant here. An "optical flow field" may be calculated wherein a vector at each image site indicates the displacement of the site between two sequential image frames. This is done by constraining the total derivative to be zero; i.e.

$$\frac{\partial I(i,j)}{\partial x} \frac{dx}{dt} + \frac{\partial I(i,j)}{\partial y} \frac{dy}{dt} + \frac{\partial I(i,j)}{\partial t} = 0$$

where:

I(i,j) is the image intensity function.
The abbreviated displacement due to motion (velocity) along x, dx/dt, is defined as u; and the velocity along y, dy/dt, is defined as v.

When attempts are made to compute an independent vector at each image site (in order to calculate the whole optical flow field), we find the problem to be ill-posed since we have one equation in two unknowns (u and v).

The present algorithm, stops short of producing the full optical flow field, but instead computes a single vector for the whole field (plus the scalar signal which is sensitive only to the temporal derivative). This procedure bypasses the difficulty of the aperture problem (mentioned earlier) by accepting the probability of underestimating the velocity component perpendicular to the spatial gradient based on its lack of consequence to the problem at hand. The computation of a single vector also reduces significantly the computational requirements with respect to computation of a full optical flow field. Also, non-linear characteristics of the image intensity function, which occur since the derivatives fail to exist at occlusion boundaries, are alleviated by performance of a smoothing of the image intensity function with a differentiatable function. (The function selected is a Gaussian function.)

After the smoothing step, satisfactory results are achieved by performing a least squares fit of u and v, to the estimated partial derivatives. The following notation is introduced:

$$(f_x^{ij}, f_y^{ij}) = \tfrac{1}{2}(\nabla\{\Gamma(i,j)_{curr}\} + \nabla\{\Gamma(i,j)_{prev}\})$$

$$f_t^{ij} = \frac{\partial \Gamma(i,j)}{\partial t}$$

where:

$I'(i,j)$ is the smoothed image intensity function
and:

{ } denotes the gradient operator.

The total derivative is to be zero, as previously stated. Given measured values for $f_x{}^{ij}$, $f_y{}^{ij}$, and $f_t{}^{ij}$ and squaring the error:

$$(f_x^{ij}u + f_y^{ij}v + f_t^{ij})^2$$

and taking the partial derivative with respect to u:

$$2f_x^{ij}(f_x^{ij}u + f_y^{ij}v + f_t^{ij})$$

and likewise with respect to v:

$$2f_y^{ij}(f_x^{ij}u + f_y^{ij}v + f_t^{ij})$$

Summing over the observations, i.e. over the pixel sites, disregarding the factor of 2, setting the sums to zero, and re-arranging yields:

$$\sum_i \sum_j (f_x^{ij})^2 u + \sum_i \sum_j f_x^{ij}f_y^{ij} v = -\sum_i \sum_j f_x^{ij}f_t^{ij}$$

$$\sum_i \sum_j f_x^{ij}f_y^{ij} u + \sum_i \sum_j (f_y^{ij})^2 v = -\sum_i \sum_j f_y^{ij}f_t^{ij}$$

This system of two linear equations in two unknowns allows a closed-form solution to the motion measurement problem. Calculation of the composite signal is conveniently chosen as:

$$\tau = \sum_i \sum_j (f_t^{ij})^2$$

Implementation of the Algorithm in the Apparatus

The above derivation resulted in a set of expressions relating desired output motion parameters to intensity values that can actually be measured from the image frames.

Figure 5:
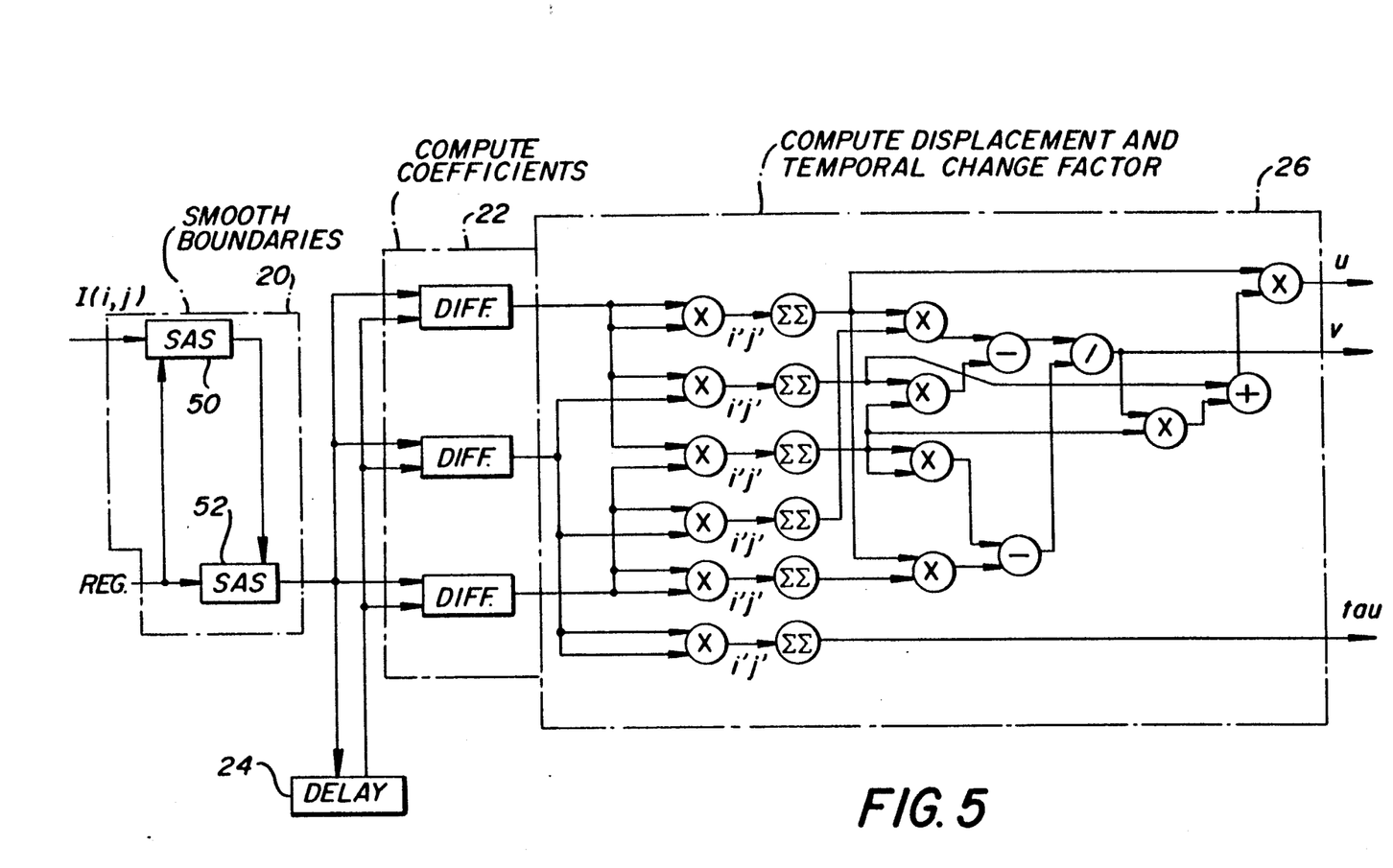
FIG. 5 illustrates the details of three of the blocks used in FIGS. 1 and 3 in a preferred logic block diagram form.

Referring now to FIG. 5, the present algorithm is implemented as a pipelined set of stages that are organized so as to maximize the degree of parallelization on the chip carrying the circuits. These include two 1-dimensional image correlations with the gaussian smoothing function; estimation of the image's partial spatial derivatives; and estimation of its temporal derivative. These measurements from the image frames, when summed over multiple image sites, provide the coefficients in the system of equations. Based on these coefficients, subsequent stages of the pipeline implement a solution of the system of equations. An additional consideration for the operation of this method is the notion of "pixel skipping" which is a direct attempt at reducing the number of input data to use as a means of reducing hardware complexity. Pixel skipping is described in detail in conjunction with the description of FIG. 8.

The steps below correspond to the hardware functions of the circuit shown in FIG. 5, organized so as to implement what was previously described mathematically and such that data dependencies are respected.

1. The digitized sensor signals I(i,j) are smoothed along one dimension (lines as they are read out,) using a compound "shift-and-add" (SAS) stage, whereby a given pixel's value is transformed using the values of its right and left neighbors. Each neighbor is shifted to a degree dependent upon its distance and in such a way as to have the effect of approximately multiplying each neighbor by the weight corresponding to a gaussian mask. Each product is only approximate due to the finite extent of the mask and the finite precision implied by constraining the weights to be powers of 2. These shifted values are added to form the resultant pixel's subsequent value. This is accomplished in SAS circuit 50. The mask "RCG" is applied to SAS 50 (as well as to SAS 52); this represents the specific gaussian mask multipliers employed, but is likely to be hard-wired within a given implementation.

A "pixel skipping factor" can be applied here such that this calculation is only performed at every nth pixel, where n is the "pixel skipping factor". The output of this stage is fed directly to stage 2.

2. A second stage of smoothing is applied utilizing the SAS circuit 52. This stage of smoothing is applied along a direction that is orthogonal Lo the first. Both the finite extent of the gaussian mask as well as pixel skipping apply here as well. The output here, however, is made available to the next stage, compute coefficients 22, directly and in a delayed version that is buffered in a one-beat delay circuit 24.

Figure 6:
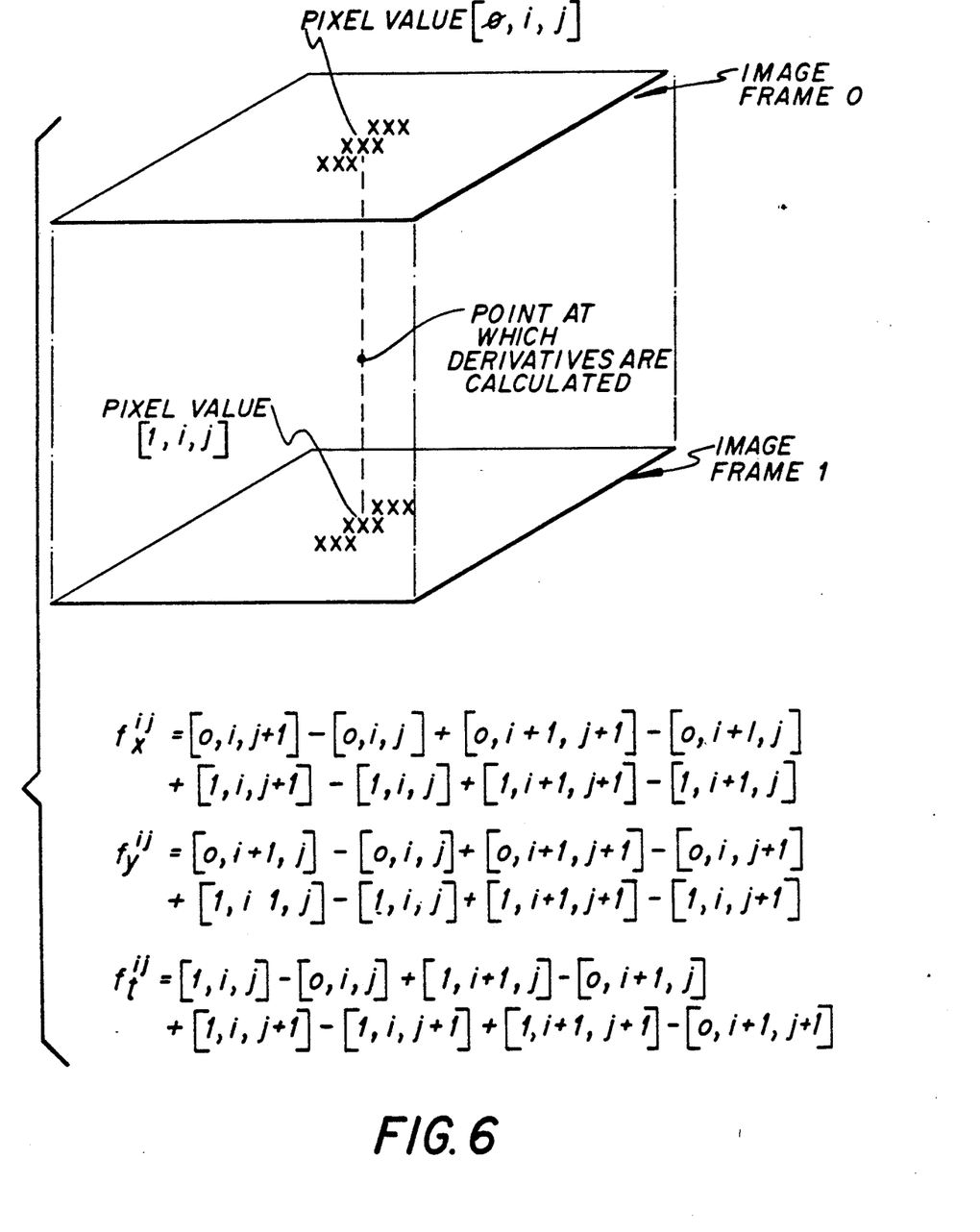
FIG. 6 illustrates in a perspective view the relationship of pixel values for two images spaced in time.

3. Next, the three partial derivatives are measured; these are the spatial derivatives with respect to x and y, and the temporal derivative. These are estimated with symmetric and finite differences utilizing the pixel itself and two of its 8-neighbors. This is done at all pixel sites remaining from the skipping performed in the prior stages. Pixels from the current frame are used along with the locally buffered previous values as detailed in FIG. 6. The current values are allowed to replace the previous values when the derivative calculation is complete. At this point, there has been calculated $f_x{}^{i'j'}$, $f_y{}^{i'j'}$, and $f_t{}^{i'j'}$; where i'j' is used to indicate that the dimensions have been reduced by the pixel skipping factor.

4. At each of the reduced pixel sites, the following are calculated: $(f_x{}^{i'j'})^2$, $f_x{}^{i'j'}f_t{}^{i'j'}$, $f_y{}^{i'j'}$, $(f_y{}^{i'j'})^2$, $f_y{}^{i'j'}f_t{}^{i'j'}$, and $(f_t{}^{i'j'})^2$.

5. Now, a summation over the reduced pixels to produce aggregates is formed for each of the quantities calculated in the previous stage. At this point the $\tau$ signal has been completed.

6. Working in scalar quantities, we calculate:

$n_1 = (f_x f_t)(f_x f_y)$, $n_2 = (f_x)^2(f_y f_t)$, $d_1 = (f_x)^2(f_y)^2$, and $d_2 = (f_x f_y)^2$ 7. We calculate:

$num = n_1 - n_2$ and $denom = d_1 - d_2$

8. And $v = num/denom$.
9. Calculate $u_1 = v(f_x, f_y)$;
10. And $u_2 = u_1 + f_x f_t$;
11. Providing: $u = -u_2(f_x)^2$.

Figure 7:
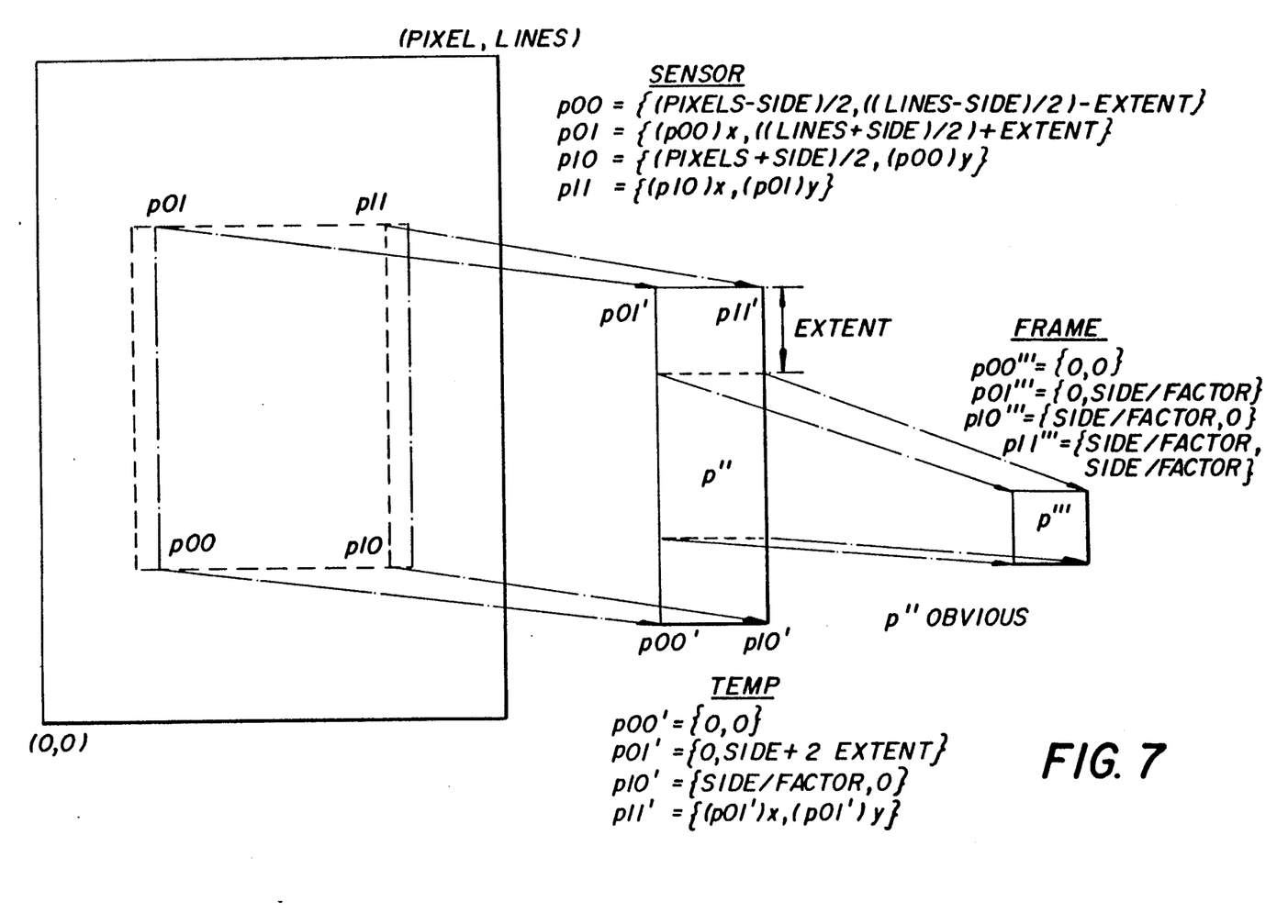
FIG. 7 illustrates in an exploded view the method of reducing data by pixel skipping and smoothing.

A significant attribute of the present invention is the extent to which the stages reduce the input data for successive stages, by virtue of the combination of smoothing and pixel skipping. Referring to FIG. 7, we see that a reduction is gained concomitant with each stage of smoothing, and that subsequent stages only need operate on the smallest array size, while still benefitting from a large percentage of the full input image's intensity data. First only the pixels from a window centered in the sensor area are used. Second, we apply pixel skipping two times consecutively, concomitant with each stage of smoothing. Due to the smoothing, we "overhang" by "extent" when we smooth; this is indicated vertically as we smooth horizontally (from "SENSOR" to "TEMP"), and horizontally when we smooth vertically (from "TEMP" to "FRAME").

It is possible to calculate the implications for hardware complexity, given as chip area. Chip area will be proportional to an expression derived from the stages used to implement the algorithm and the number of data points to be processed at each stage. Noting the effects of the three factors effecting this complexity, the following can be seen:

1. Window side, s, will contribute its square in operations for each stage which operates at individual image sites or direct derivations of them.
2. Pixel skipping factor, n, will decrease the number of operations at a stage where skipping is done by division.
3. Extent of the gaussian mask, e, will increase the number of operations by itself as a factor at stages where it is used, since neighbor operations are required.
4. After results from individual image sites are aggregated, an additive constant may be used to account for the fixed number of these scalar operations.

For the present algorithm and with some stages combined:

$$\text{area} \, \alpha \, \frac{es^2}{n} + \frac{es^2}{n^2} + \frac{3s^2}{n^2} + 10$$

e is the extent of the gaussian;
s is the window side; and
n is the pixel skipping factor.

The first term defines the complexity of the first stage, which is the extent of the gaussian mask multiplied by the square of the window side and divided by the pixel skipping factor. The second term represents the second stage, which is similar in complexity to the first except that pixel skipping has now been applied along both dimensions. The third term represents stages 3 through 5, which are area operations but which do not utilize significant neighbor operations. The last constant term represents stages 6 through 11, which are scalar operations. Admittedly, the relation is only approximate, since it treats all operations uniformly; it does, however, provide an adequate measure of area complexity for the purpose of comparison.

Table 1 exhibits a table of area complexities calculated from the above expression, at three levels for each factor, and divided through by the least of those calculated (so that the least complex shows as a "1" in the table and all others can be interpreted as multipliers):

| | | Side | | | | | | | |
|---|---|---|---|---|---|---|---|---|---|
| | | 50 | | | 125 | | | 200 | |
| | | Factor | | | | | | | |
| | | 11 | 6 | 1 | 11 | 6 | 1 | 11 | 6 | 1 |
| Extent | 1 | 1 | 2 | 40 | 6 | 13 | 245 | 15 | 35 | 630 |
| | 6 | 4 | 10 | 120 | 30 | 60 | 740 | 75 | 155 | 1890 |
| | 11 | 8 | 17 | 200 | 55 | 110 | 1230 | 140 | 280 | 3145 |

Thus, we see profound ramifications of setting the factors to various values, and how they interact with respect to area complexity in a chip circuit. This is entirely relevant to a detailed design when coupled with the following experimental findings:

The size of the window has very little effect on accuracy. A reduction in size may then be attractive for reducing hardware complexity.

As the window gets smaller there is more sensitivity to image detail; i.e., the measurements vary much more across the multiple images when a small window is used than when a larger window is used. There does not appear to be much point in using windows larger than 120×120, however.

In general motion accuracy is most accurate when motion both parallel ("magnitude") and orthogonal ("normal") are in the middle range. Also, when there is a disparity between the value of the "magnitude" and the "normal" accuracy degrades. This indicates that the accuracy is best when the two components of motion are about equal. (Control can be established over the magnitude of the pixel size and frame rate, coupled with a realistic motion model, to define the ranges of the algorithm.)

It has been found that motion in the extremes of the range decrease accuracy, and it was also found that there is a greater sensitivity to image detail in these extremes. However the sensitivity of image detail is not significantly effected by the direction of the motion (i.e., as was the case with accuracy being best when "magnitude" and "normal" were equal).

Increasing the extent of the gaussian mask improves the accuracy to an extent of approximately 6 or 7, across the range of motion that was investigated. Further increases in the mask actually caused a degradation in accuracy, probably attributed to over-blurring with respect to the desired range.

Regardless of the amount of motion the larger mask sizes tend to decrease the algorithm's sensitivity to image detail.

Pixel skipping improves accuracy to values of 4 or 5 for low magnitudes but it is desirable to go higher for high magnitudes.

As with the mask extent, it does not turn out that pixel skipping factor and translation magnitude interact significantly when the sensitivity to image detail is measured.

Appendix A is a code listing that was used to perform the method of the present invention.

While there has been shown what are considered to be the preferred embodiments of the present invention, it will be manifest that many changes and modifications may be made therein without departing from the essential spirit of the invention. It is intended, therefore, in the annexed claims, to cover all such changes and modifications as may fall within the true scope of the invention.

APPENDIX A

```c
/*
 * NAME
 *     gradient:  Camera motion algorithm based on spatio-temporal gradient
 *                approach.
 *
 * Andrew J. Buckler, gradient.c 1.5 8/31/89
 *
 */ include <stdio.h>
include <math.h> define SQUARE(parm) ( (parm)*(parm) )

/* GLOBAL VARIABLES
 */
extern char **sensor, **previous;
extern long pixels, lines;
extern int window_side, factor, sigma, extent;   /* command line options */ double *rcg;
double **frame[2];   /* the output of "smooth" */
double **temp;   /* used by "smooth" */

/* IMAGE SMOOTHING
 */
void smooth(array)
char **array;
{
    int i, j, k, ii, jj;
    int index = ((array == previous) ? 0 : 1);

/* Form a temporary frame, as the result of the 1D correlation of 'array' and
     * 'rcg' (i.e., smooth the input in one dimension).
     *
     * Since we had been so clever as to reduce the window by an appropriate degree
     * needn't worry about edge effects here.
     */
    for (ii=0, i=((lines-window_side)/2)-extent; i < ((lines+window_side)/2)+extent; i++)
        for (jj=0, j=(pixels-window_side)/2; j < ((pixels+window_side)/2)-factor; j++)
        {
          temp[ii][jj] = 0.0;
          for (k = 0; k <= extent*2; k++)
             temp[ii][jj] += rcg[k] * ((unsigned)array[i][j-extent+k]&0x00ff);
        }

/* Now complete the correlation: temp, rcg -> frame[index];
    * taking care not to have the extent of the mask reach beyond good data.
    */
   for (ii=0, i=extent; i < window_side+extent-factor; ii++, i+=factor)
       for (j=0; j < (window_side/factor)-1; j++)
       { frame[index][ii][j] = 0.0;
      for (k = 0; k <= extent*2; k++)

frame[index][ii][j] += (rcg[k] * temp[i-extent+k][j]);
        }

} /* "smooth" */

/* INITIALIZATION
 */
```

```c
int init_compute()
{
    int index, i, k;
    double sum;

/* Allocate space for the various arrays we'll use - first for the mask:
     */
    if ( (rcg = (double *)calloc((unsigned)(extent*2)+1, sizeof(double))) == NULL )
    {
        fprintf(stderr, "No room for mask buffer!... exiting\n");
        exit(1);
    }

/* Next, for a temporary working frame (used because we perform two 1D correlatk
     * rather than one 2D, for efficiency and due to separability of the gaussian).
     *
     * The dimensions of this array need to be (window_side+2*extent) X (window_side
     * since we reduce the input by those amounts as we form the temporary.
     */
    if ( (temp = (double **)
            calloc((unsigned)(window_side+2*extent), sizeof(double *))) == NULL )
    {
        fprintf(stderr, "No room for line buffer array!... exiting\n");
        exit(1);
    }
    for (i = 0; i < (window_side+2*extent); i++)
        /* Allocate storage for the line */
        if ( (temp[i] = (double *)
                calloc((unsigned)(window_side/factor), sizeof(double))) == NULL )
        {
            fprintf(stderr, "No room for line buffer!... exiting\n");
            exit(1);
        }

/* And finally for the smoothed frames. These are smaller yet, having
 * dimensions (window_side/factor) X (window_side/factor).
 */
for (index = 0; index < 2; index++)
{
    if ( (frame[index] = (double **)
        calloc((unsigned)window_side/factor, sizeof(double *))) == NULL )
    {
        fprintf(stderr, "No room for line buffer array!... exiting\n");
        exit(1);
    } for (i = 0; i < window_side/factor; i++)
    {
        /* Allocate storage for the line */
        if ( (frame[index][i] = (double *)
         calloc((unsigned)window_side/factor, sizeof(double))) == NULL )
        {
            fprintf(stderr, "No room for line buffer!... exiting\n");
            exit(1);
        }
    }

}

/* Compute a mask which approximates the gaussian.
 *
 * First estimate the weights, then pass back over to ensure they sum to one.
 */
for (sum = 0, k = 0, i = -extent; i <= extent; k++, i++)
{
    /* typical gaussian: */
    rcg[k] = exp((double)(-0.5 * SQUARE(i/(double)sigma)));
    /* update a sum of these estimates: */
    sum += rcg[k];
} for (k = 0, i = -extent; i <= extent; k++, i++)
    /* normalize rcg: */
    rcg[k] = rcg[k] / sum;
```

```
    /* Smooth the first frame.  Henceforth, smoothing for the subsequent
     * frames will be done when velocities themselves are computed.
     */
    smooth(previous);

return(0);
}

/*  COMPUTE VELOCITIES
 */
void compute_velocities(p_uout, p_vout)
double *p_uout, *p_vout;
{
    int i, j;   /* counters */
    double fxx = 0, fyy = 0, fxt = 0, fyt = 0, fxy = 0;     /*coefficients */
    double num, denom, u, v;
    double **tmp;

/* Compute the smoothed input:
     */
    smooth(sensor);

/* Calculate the coefficients:
     */
    for (i=0; i < (window_side/factor)-2; i++)
        for (j=0; j < (window_side/factor)-2; j++)
        {
            double fx, fy, ft;

/* frame[0] is previous, frame[1] is sensor */
            fx = frame[0][i][j+1]-frame[0][i][j]+frame[0][i+1][j+1]-frame[0][i+1][j]
                +frame[1][i][j+1]-frame[1][i][j]+frame[1][i+1][j+1]-frame[1][i+1][j];

fy = frame[0][i+1][j]-frame[0][i][j]+frame[0][i+1][j+1]-frame[0][i][j+1]
                +frame[1][i+1][j]-frame[1][i][j]+frame[1][i+1][j+1]-frame[1][i][j+1];

ft = frame[1][i][j]-frame[0][i][j]+frame[1][i+1][j]-frame[0][i+1][j]
                +frame[1][i][j+1]-frame[0][i][j+1]+frame[1][i+1][j+1]-frame[0][i+1][j+1];
            fxx += SQUARE(fx);
            fyy += SQUARE(fy);
            fxy += fx * fy;
            fxt += fx * ft;
            fyt += fy * ft;
        } if ( (i*j) == 0 )
    {
        fprintf(stderr, "Not even one point left!\n");
        exit(1);
    }

/* Solve for u and v.
     *
     *      fxx*u + fxy*v = -fxt;
     *      fxy*u + fyy*v = -fyt;
     */
    num = (fxt/fxx) - (fyt/fxy);
    denom = (fyy/fxy) - (fxy/fxx);
    v = num/denom;
    u = -(1/fxx) * (fxt + (fxy*v));
```

```
/* Store the results, scaled by the appropriate factor!
 */
*p_uout = u*factor;
*p_vout = v*factor;

tmp = frame[0];  /* we need to save our allocated space, though the data
                  * will be trashed */
frame[0] = frame[1];  /* this data is kept, of course */
frame[1] = tmp;

} /* "compute_velocities" */
```

We claim:

1. A method for minimizing the effects of motion in the recording of an optical image on a recording medium comprising the steps of:
   a. capturing at least two sequential images in electrical form as a plurality of pixel values each representing the intensity of the image at a corresponding pixel site;
   b. digitizing each of said pixel values to form digitized images;
   c. smoothing the pixel values in said digitized images at each pixel site utilizing a mask of gaussian multipliers on the neighboring pixel values to form a smoothed value at each of said pixel sites.
   d. determining the change in intensity at each pixel site by computing two spatial and one temporal derivative components within the image;
   e. computing motion parameters corresponding to the degree of motion and its net direction utilizing the computation of the components of change within the image; and
   f. utilizing said computed motion parameters to control the recording of said image on said recording medium.

2. The method according to claim 1 wherein step d further comprises the step of:
   utilizing a finite number of neighboring pixel values in a symmetric difference calculation.

3. The method according to claim 1 wherein the motion parameters of step e are computed by forming a partial differential equation of a vector at each site indicating the displacement of the site between two sequential image frames and constraining the total derivative of the partial differential equation to be zero.

4. The method according to claim 1 wherein the motion parameters of step e are stored for future use.

5. A method for minimizing the effects of motion in the recording of an optical image on a recording medium comprising the steps of:
   a. capturing at least two sequential images in electrical form as a plurality of pixel values each representing the intensity of the image at a corresponding pixel site;
   b. digitizing each of said pixel values to form digitized images;
   c. smoothing the pixel values in said digitized images at each pixel site utilizing a mask of gaussian multipliers on the neighboring pixel values to form a smoothed value at each of said pixel sites and utilizing the gaussian multipliers along a first dimension of the image to form an intermediate result and utilizing the gaussian multipliers along an orthogonal dimension of the image to form a smoothed value at each of said pixel values;
   d. determining the change in intensity at each pixel site by computing two spatial and one temporal derivative components within the image;
   e. computing motion parameters corresponding to the degree of motion and its net direction utilizing the computation of the components of change within the image; and
   f. utilizing said computed motion parameters to control the recording of said image on said recording medium.

6. A method for minimizing the effects of motion in the recording of an optical image on a recording medium comprising the steps of:
   a. capturing at least two sequential images in electrical form as a plurality of pixel values each representing the intensity of the image at a corresponding pixel site;
   b. digitizing each of said pixel value to form digitized images;
   c. smoothing the pixel values at sites skipped by a predetermined number of pixel sites in said digitized images;
   d. determining the change in intensity at each pixel site by computing two spatial and one temporal derivative ccmponents within the image;
   e. computing motion parameters corresponding to the degree of motion and its net direction utilizing the computation of the components of change within the image; and
   f. utilizing said computed motion parameters to control the recording of said image on said recording medium.

7. A method for minimizing the effects of motion in the recording of an optical image on a recording medium comprising the steps of:
   a. capturing at least two sequential images in electrical form as a plurality of pixel values each representing the intensity of the image at a corresponding pixel site;
   b. digitizing each of said pixel values to form digitized images;
   c. smoothing the pixel values in said digitized images;
   d. determining the change in intensity at each pixel site by computing two spatial and one temporal derivative components within the image;
   e. computing by at least squares fit motion parameters corresponding to the degree of motion and its net direction utilizing the computation of the components of change within the image; and
   f. utilizing said computed motion parameters to control the recording of said image on said recording medium.

8. The method according to claim 1 wherein the motion parameters of step e are used to influence the exposure time of the recording medium to the optical image.

9. A method for minimizing the effects of motion in the recording of an optical image on a recording medium comprising the steps of:
   a. capturing at least two sequential images in electrical form as a plurality of pixel values each representing the intensity of the image at a corresponding pixel site;
   b. digitizing each of said pixel values to form digitized images;
   c. smoothing the pixel values in said digitized images;
   d. determining the change in intensity at each pixel site by computing two spatial and one temporal derivative components within the image;
   e. computing motion parameters corresponding to the degree of motion and its net direction utilizing the computation of the components of change within the image;
   f. utilizing said computed motion parameters to control the recording of said image on said recording medium; and
   g. moving; said recording medium in accordance with said computed parameters to compensate for motion.

10. A method for minimizing the effects of motion in the recording of an image onto a recording medium utilizing a camera having an image recording medium and a sensor means for receiving the image and for converting a portion of the received image into electrical signals as a plurality of pixel values each representing the intensity of the image at a corresponding pixel site comprising the steps of:
   a. sensing at displaced times the intensity value of the image at a number of area associated pixel sites;
   b. digitizing each of the plurality of intensity values resulting from the sensing of step a to form digitized pixel values;
   c. smoothing the digitized pixel values of step b utilizing a mask of gaussian multipliers on the neighboring pixel values to form a smoothed value at each of said pixel sites;
   d. determining the change in the intensity at each corresponding site by computing two orthogonal spatial and one temporal component of change within the image utilizing the smoothed digital pixel values of step c;
   e. computing motion parameters corresponding to the degree of motion and its direction utilizing the components of change within the image; and
   f. utilizing said computed motion parameters to control the recording of said image on said recording medium.

11. The method according to claim 10 wherein step c further comprises the steps of:
   utilizing the gaussian multipliers along a first dimension of the image to form an intermediate result;
   utilizing the gaussian multipliers along an orthogonal dimension of the image to form a smoothed value at each of said pixel values.

12. The method according to claim 10 wherein step d further comprises the step of:
   utilizing a finite number of neighboring pixel values in a symmetric difference calculation.

13. The method according to claim 10 wherein the motion parameters of step e are computed by forming a partial differential equation of a vector at each site indicating the displacement of the site between two sequential image frames and constraining the total derivative of the partial differential equation to be zero.

14. The method according to claim 10 wherein the motion parameters of step e are computed by performing a least squares fit.

15. The method according to claim 10 wherein the motion parameters of step e are used to influence the exposure time of the recording medium to the optical image.

16. The method according to claim 10 wherein the motion parameters of step e are stored for future use.

17. A method for minimizing the effects of motion in the recording of an image onto a recording medium utilizing a camera having an image recording medium and a sensor means for receiving the image and for converting a portion of the received image into electrical signals as a plurality of pixel values each representing the intensity of the image at a corresponding pixel site comprising the steps of:
   a. sensing at displaced times the intensity value of the image at a number of area associated pixel sites;
   b. digitizing each of the plurality of intensity values resulting from the sensing of step a to form digitized pixel values;
   c. smoothing the digitized pixel values of step b at sites skipped by a predetermined number of pixel sites in said digitized images;
   d. determining the change in the intensity at each corresponding site by computing two orthogonal spatial and one temporal component of change within the image utilizing the smoothed digital pixel values of step c;
   e. computing motion parameters corresponding to the degree of motion and its direction utilizing the components of change within the image; and
   f. utilizing said computed motion parameters to control the recording of said image on said recording medium.

18. A method for minimizing the effects of motion in the recording of an image onto a recording medium utilizing a camera having an image recording medium and a sensor means for receiving the image and for converting a portion of the received image into electrical signals as a plurality of pixel values each representing the intensity of the image at a corresponding pixel site comprising the steps of:
   a. sensing at displaced times the intensity value of the image at a number of area associated pixel sites;
   b. digitizing each of the plurality of intensity values resulting from the sensing of step a to form digitized pixel values;
   c. smoothing the digitized pixel values of step b;
   d. determining the change in the intensity at each corresponding site by computing two orthogonal spatial and one temporal component of change within the image utilizing the smoothed digital pixel values of step c;
   e. computing motion parameters corresponding to the degree of motion and its direction utilizing the components of change within the image; and
   f. utilizing said computed motion parameters to control the recording of said image on said recording medium; and g. moving said recording medium in accordance with said computed parameters to compensate for motion.

19. The apparatus according to claim 18 and further comprising:
compensation means for determining exposure parameters receiving as inputs the motion displacement signals from said means for computing motion parameters along with a signal having a level corresponding to the intensity of the original image, and the ASA value of the recording medium and for providing compensated motion parameter signals to said means for utilizing.

20. The apparatus according to claim 18 wherein said means for utilizing is comprised of shutter means and aperture means each responsive to said provided compensation motion parameter signals for controlling the impinging of the original image onto the recording media.

21. An apparatus for minimizing the effects of motion in the recording of an image onto a recording medium comprising:
   a. sensing means for sensing, at displaced times, the intensity value of an image at a number of area associated pixel sites;
   b. digitizing means for digitizing each of the plurality of intensity values received from said sensing means to form digitized pixel values;
   c. smoothing means connected to receive the output from said digitizing means for smoothing said digitized pixel values;
   d. means for determining the change in the intensity at each corresponding site by computing two orthogonal spatial and one temporal component of change within the image utilizing the smoothed digital pixel values from said smoothing means;
   e. means for computing motion parameters corresponding to the degree of motion and its direction utilizing the components of change within the image;
   f. means for utilizing said computed motion parameters to control the recording of said image on said recording medium; and
   g. means coupled to said recording medium for providing motion along at least one axis in response to said displacement signals to compensate for detected motion.

22. An apparatus for minimizing the effects of motion in the recording of an image onto a recording medium comprising:
   a. sensing means for sensing, at displaced times, the intensity value of an image at a number of area associated pixel sites;
   b. digitizing means for digitizing each of the plurality of intensity values received from said sensing means to form digitized pixel values;
   c. smoothing means connected to receive the output from said digitizing means for providing smoothed digitized pixel values;
   d. delay means for receiving the output from said smoothing means and for providing a delayed version of said smoothed pixel values;
   e. compute coefficients means for receiving as inputs the delayed and the non-delayed versions of said smoothed pixel values and for providing as outputs displacement signals to a means for computing motion parameters;
   f. means for determining the change in the intensity at each corresponding site by computing two orthogonal spatial and one temporal component of change within the image utilizing the smoothed digital pixel values from said smoothing means;
   g. means for computing motion parameters corresponding to the degree of motion and its direction utilizing the components of change within the image;
   h. means for utilizing said computed motion parameters to control the recording of said image on said recording medium; and
   i. means coupled to said recording medium for providing motion along at least one axis in responsive to said displacement signals to compensate for detected motion.

* * * * *